US012698821B2

(12) United States Patent　　　　　　　(10) Patent No.:　　US 12,698,821 B2

Herman　　　　　　　　　　　　　　　　　(45) Date of Patent:　　　　Aug. 4, 2026

(54) TENSIONING APPARATUS

(71) Applicant: The Timken Company, North Canton, OH (US)

(72) Inventor: Daryl L. Herman, Nixa, MO (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 19/164,662

(22) PCT Filed: Oct. 16, 2024

(86) PCT No.: PCT/US2024/051617

§ 371 (c)(1),
(2) Date: Sep. 12, 2025

(87) PCT Pub. No.: WO2025/085542

PCT Pub. Date: Apr. 24, 2025

(65) Prior Publication Data

US 2026/0117845 A1　　　Apr. 30, 2026

Related U.S. Application Data

(60) Provisional application No. 63/591,855, filed on Oct. 20, 2023.

(51) Int. Cl.
F16H 7/12　　　　　(2006.01)
F16H 7/08　　　　　(2006.01)

(52) U.S. Cl.
CPC ......... F16H 7/1281 (2013.01); F16H 7/1263 (2013.01); *F16H 2007/0806* (2013.01);
(Continued)

(58) Field of Classification Search
CPC ................ F16H 7/1281; F16H 7/1263; F16H 2007/0806; F16H 2007/0891;
(Continued)

(56) References Cited

U.S. PATENT DOCUMENTS 1,374,643 A * 4/1921 Fischbach ............. F16H 7/1263
474/138
1,694,652 A * 12/1928 Hager ...................... B61C 9/00
474/84

(Continued)

FOREIGN PATENT DOCUMENTS

EP　　　　　1688643 A2　　8/2006

OTHER PUBLICATIONS

International Search Report and Written Opinion for Application No. PCT/US2024/051617 dated Jan. 22, 2025 (8 pages).

*Primary Examiner* — Henry Y Liu

(74) *Attorney, Agent, or Firm* — Michael Best & Friedrich LLP

(57)　　　　　　　　ABSTRACT

A tensioning apparatus for a belt including a pulley defining an outer surface to receive the belt and a trolley including a mount configured to support the pulley for rotation, a first bushing, a second bushing, and an interior cavity. The tensioning apparatus includes a biasing member disposed within the interior cavity and an adjustable length arm assembly including a fixed-length portion and an adjuster portion. The fixed-length portion includes a pivot mount for rotatably mounting the tensioning apparatus. The adjuster portion includes a fastener threaded to the fixed-length portion and an engagement member that engages and deforms the biasing member in response to adjustment of the fastener. The first bushing and the second bushing establish a sliding interface along an outer surface of the adjustable length arm assembly for movement of the trolley.

20 Claims, 15 Drawing Sheets

(52) U.S. Cl.
CPC ............... *F16H 2007/0842* (2013.01); *F16H 2007/0865* (2013.01); *F16H 2007/088* (2013.01); *F16H 2007/0891* (2013.01); *F16H 2007/0893* (2013.01); *F16H 2007/0897* (2013.01)

(58) Field of Classification Search
CPC ....... F16H 2007/088; F16H 2007/0893; F16H 2007/0865; F16H 2007/0897; F16H 2007/0842
See application file for complete search history.

(56) References Cited

U.S. PATENT DOCUMENTS

| | | | | |
|---|---|---|---|---|
| 1,783,987 | A * | 12/1930 | Thompson | F16H 7/1272 474/138 |
| 2,014,397 | A | 9/1935 | Smith | |
| 2,650,505 | A * | 9/1953 | Vannatta | F16H 35/02 474/138 |
| 2,663,195 | A * | 12/1953 | Horan | F16H 7/1281 474/135 |
| 2,703,019 | A * | 3/1955 | Burawoy | F16H 7/1272 474/138 |
| 2,920,361 | A * | 1/1960 | Michalowski | B22C 5/0477 474/138 |
| 3,413,866 | A * | 12/1968 | Ford | F16H 7/1272 474/138 |
| 3,746,413 | A * | 7/1973 | Nishikawa | F16D 1/0817 384/542 |
| 3,763,715 | A * | 10/1973 | Pollard | F16H 7/1263 474/137 |
| 4,416,648 | A * | 11/1983 | Radocaj | F16H 7/1272 474/138 |
| 4,708,696 | A * | 11/1987 | Kimura | F16H 7/1236 474/138 |
| 4,708,697 | A * | 11/1987 | Foster | F16H 7/1236 474/135 |
| 4,728,317 | A * | 3/1988 | Martz | F16H 7/1236 474/136 |
| 4,993,993 | A * | 2/1991 | Gill | F16H 7/1263 474/111 |
| 5,030,173 | A * | 7/1991 | Bryant | B65G 23/44 474/138 |
| 5,244,439 | A * | 9/1993 | Rogus | F16H 7/1263 474/190 |
| 5,480,358 | A * | 1/1996 | Sakai | F16H 7/1227 474/135 |
| 5,591,094 | A * | 1/1997 | Farmer | F16H 7/1218 474/135 |
| 6,030,305 | A * | 2/2000 | Hood | F16H 7/14 474/150 |
| 6,117,034 | A * | 9/2000 | Vine | F16H 7/1263 474/134 |
| 6,165,089 | A * | 12/2000 | McGreal | F16H 7/1263 474/138 |
| 6,422,964 | B1 * | 7/2002 | Rointru | F16H 7/1218 474/138 |
| 6,607,459 | B1 * | 8/2003 | Serkh | F16H 7/1218 474/138 |
| 6,743,132 | B2 * | 6/2004 | Serkh | F16H 7/1218 474/136 |
| 7,004,864 | B2 * | 2/2006 | Hotta | F16H 7/1263 474/135 |
| 7,419,447 | B2 * | 9/2008 | Serkh | F16H 7/1218 474/134 |
| 7,530,911 | B2 * | 5/2009 | Serkh | F16H 7/1218 474/134 |
| 7,824,286 | B2 * | 11/2010 | Schmid | F16H 7/1281 474/138 |
| 7,837,582 | B2 * | 11/2010 | Smith | F16H 7/1281 474/138 |
| 8,216,101 | B2 * | 7/2012 | Numajiri | F16H 7/1263 474/138 |
| 8,888,625 | B2 * | 11/2014 | Lehman | F16H 7/1263 474/119 |
| 9,151,366 | B2 * | 10/2015 | Antchak | F16H 7/12 |
| 9,464,697 | B2 * | 10/2016 | Antchak | F16H 7/12 |
| 9,599,199 | B2 * | 3/2017 | Graves | F16F 3/04 |
| 9,618,099 | B2 * | 4/2017 | Ward | F16H 7/1245 |
| 9,739,349 | B2 * | 8/2017 | Gergis | F16H 7/08 |
| 10,830,316 | B2 * | 11/2020 | Singh | F16H 7/1263 |
| 11,125,302 | B2 * | 9/2021 | Schug | F16H 7/08 |
| 11,493,113 | B2 * | 11/2022 | Salunkhe | F04D 29/403 |
| 11,536,350 | B1 * | 12/2022 | Long | F16H 7/08 |
| 11,603,910 | B2 * | 3/2023 | Salunkhe | F16H 7/1281 |
| 12,313,430 | B2 * | 5/2025 | Santos | G01D 5/145 |
| 2002/0039943 | A1 * | 4/2002 | Serkh | F16H 7/1218 474/134 |
| 2002/0039946 | A1 * | 4/2002 | Serkh | F16H 7/1218 474/138 |
| 2003/0109343 | A1 * | 6/2003 | Martinson | F16H 7/1263 474/107 |
| 2004/0087401 | A1 * | 5/2004 | Serkh | F16H 7/1218 474/134 |
| 2006/0276284 | A1 * | 12/2006 | Lancaster | F16H 7/1263 474/133 |
| 2007/0161444 | A1 * | 7/2007 | Hartmann | F16H 7/14 474/133 |
| 2009/0062046 | A1 * | 3/2009 | Lindemann | F16H 7/1263 474/101 |
| 2010/0016106 | A1 * | 1/2010 | Minemura | B41J 3/4071 474/113 |
| 2014/0000397 | A1 * | 1/2014 | Nolta, Jr. | B60H 1/00857 74/393 |
| 2015/0247559 | A1 * | 9/2015 | Graves | F16F 15/067 474/117 |
| 2017/0016517 | A1 * | 1/2017 | Ward | F16H 7/1218 |
| 2017/0138445 | A1 * | 5/2017 | Farewell | F16H 7/1281 |
| 2019/0178353 | A1 * | 6/2019 | Singh | F16H 7/1263 |
| 2020/0340553 | A1 * | 10/2020 | Salunkhe | F16H 7/1281 |
| 2020/0370627 | A1 * | 11/2020 | Caprotti | F16H 7/0831 |
| 2021/0270349 | A1 * | 9/2021 | Grotto | F16M 11/18 |
| 2022/0412774 | A1 * | 12/2022 | Santos | G01D 5/145 |
| 2023/0091770 | A1 * | 3/2023 | Long | F16H 7/1209 474/101 |

* cited by examiner

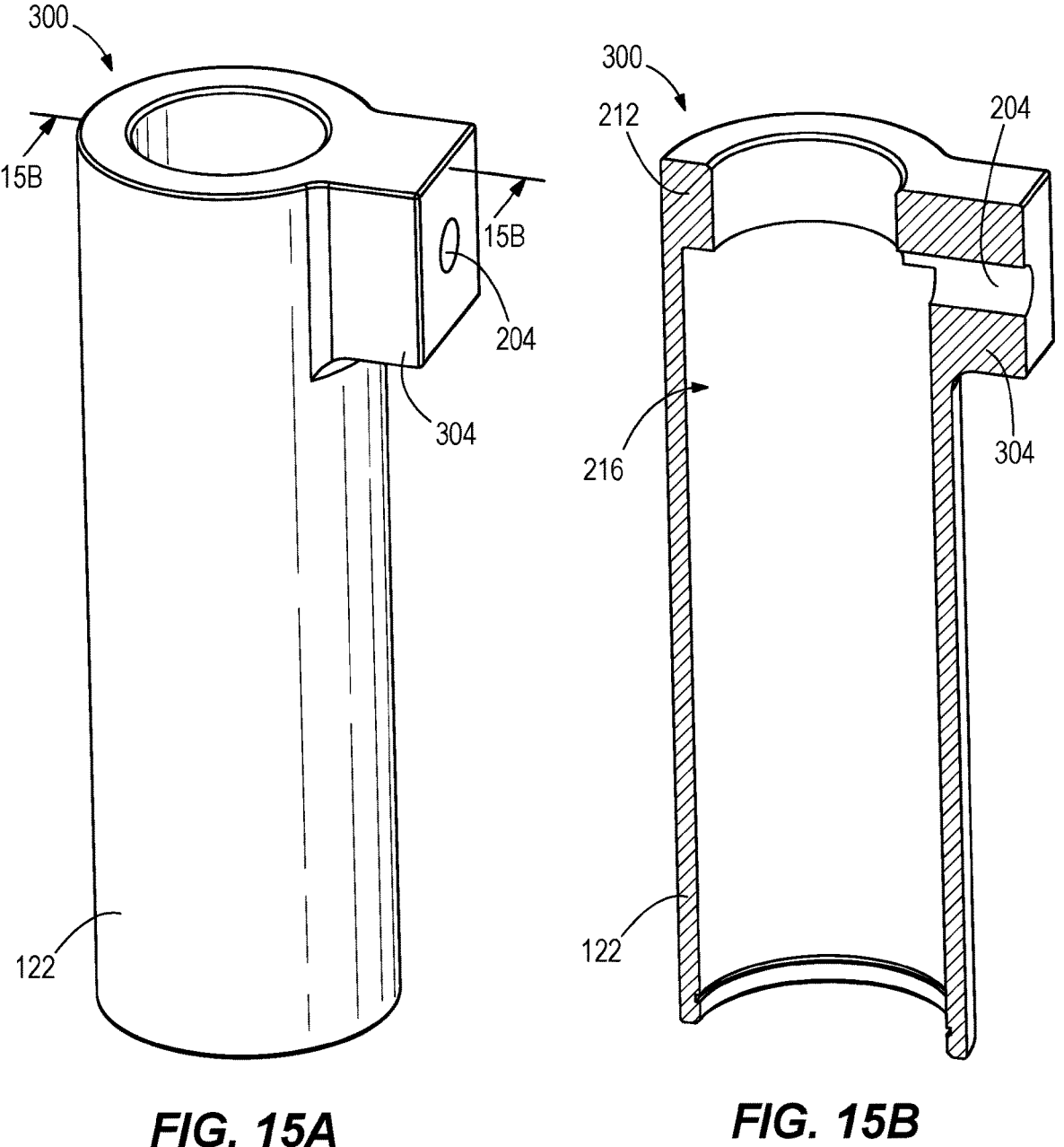
FIG. 15A          FIG. 15B

TENSIONING APPARATUS

CROSS-REFERENCE TO RELATED APPLICATION

This application claims priority to U.S. Provisional Patent Application No. 63/591,855, filed Oct. 20, 2023, the entire contents of which are incorporated by reference herein.

BACKGROUND

The present disclosure relates to a tensioning apparatus for belt drive systems.

SUMMARY

The present invention provides, in one aspect, a tensioning apparatus for a belt including a pulley defining an outer surface to receive the belt and a trolley including a mount configured to support the pulley for rotation, a first bushing, a second bushing, and an interior cavity. The tensioning apparatus includes a biasing member disposed within the interior cavity and an adjustable length arm assembly including a fixed-length portion and an adjuster portion. The fixed-length portion includes a pivot mount for rotatably mounting the tensioning apparatus. The adjuster portion includes a fastener threaded to the fixed-length portion and an engagement member that engages and deforms the biasing member in response to adjustment of the fastener. The first bushing and the second bushing establish a sliding interface along an outer surface of the adjustable length arm assembly for movement of the trolley.

The present invention provides, in another aspect, a tensioning apparatus for a belt including a pulley defining an outer surface to receive the belt and a trolley including a mount configured to support the pulley for rotation and an interior cavity. The tensioning apparatus includes a biasing member disposed within the interior cavity and an adjustable length arm assembly including a fixed-length portion and an adjuster portion. The fixed-length portion defines an adjustment axis and includes a pivot mount for rotatably mounting the tensioning apparatus. The adjuster portion includes a fastener threaded to the fixed-length portion and an engagement member that engages and deforms the biasing member in response to adjustment of the fastener along the adjustment axis. A first interface is defined between a cross section profile of the trolley and a cross section profile of the adjustable length arm assembly at a location of axial overlap along the adjustment axis of the trolley and the adjustable length arm assembly. The first interface includes an excess clearance that is set to achieve a predetermined rotational allowance of the trolley about the adjustment axis relative to the adjustable length arm assembly.

The present invention provides, in yet another aspect, a tensioning apparatus for a belt including a pulley defining an outer surface to receive the belt and a trolley including a mount configured to support the pulley for rotation, a first end and a second end opposite the first end, and an interior cavity. The tensioning apparatus includes a biasing member disposed within the interior cavity and an adjustable length arm assembly including a fixed-length portion and an adjuster portion. The fixed-length portion defines an adjustment axis and includes a pivot mount for rotatably mounting the tensioning apparatus. The adjuster portion includes a first fastener threaded to the fixed-length portion and an engagement member that engages and deforms the biasing member in response to adjustment of the first fastener. The biasing member is disposed between an interior of the trolley and an exterior of the adjustable length arm assembly. The biasing member engages the engagement member and the first end of the trolley such that the trolley is moveable on the adjustable length arm assembly along the adjustment axis in response to the biasing member expanding.

BRIEF DESCRIPTION OF THE DRAWINGS

FIG. 15A illustrates a perspective view of a trolley according to another embodiment.

FIG. 15B illustrates a longitudinal cross-section of the trolley taken along line 15B-15B of FIG. 15A.

DETAILED DESCRIPTION

Figure 1:
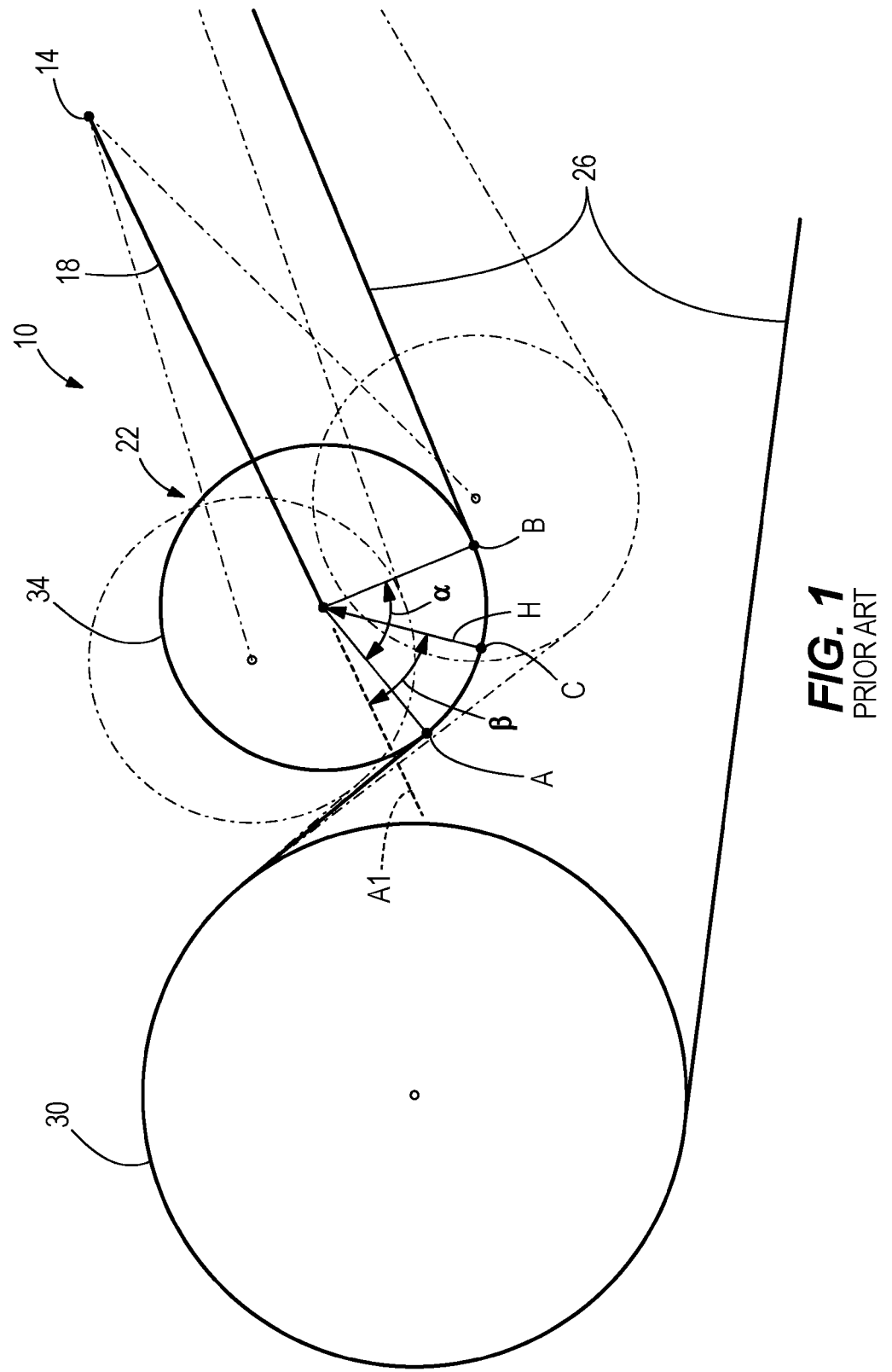
FIG. 1 illustrates a schematic view of a traditional tensioning apparatus for a belt.

FIG. 1 illustrates a traditional tensioning apparatus 10 including a pivot point 14 and a tensioner arm 18 that pivots about the pivot point 14. The tensioning apparatus 10 further includes a pulley 22 that is contact with a belt 26 adjacent to a driven pulley 30. The pulley 22 receives the belt 26 on an outside surface 34 between points A and B. An angular span a is defined between the points A and B and is known as the "wrap" of the belt 26. The belt 26 induces a hub load H on the pulley 22 at a point C, which is located at a point that bisects the angular span α or the wrap of the belt 26. The hub load H is angularly displaced from an arm axis A1 defined by the tensioner arm 18 by a differential angle β. Since the hub load His displaced by the differential angle β, the tensioning apparatus 10 experiences a moment force (clockwise as shown) about the pivot point 14. As such, the tensioning apparatus 10 includes a biasing mechanism (not shown) to counteract the moment force such that the outside surface 34 of the pulley 22 remains in contact with the belt 26 and supplies tension. For example, a spring can be provided transverse to the tensioner arm 18. FIG. 1 also illustrates the different positions of the tensioning apparatus 10 with phantom lines. The orientation of the tensioner arm 18 of the tensioning apparatus 10 (and thus, the differential angle β) changes dependent upon the size of the belt 26, the hub load H, and elongation (e.g., stretching and wear) of the belt 26.

Figure 2:
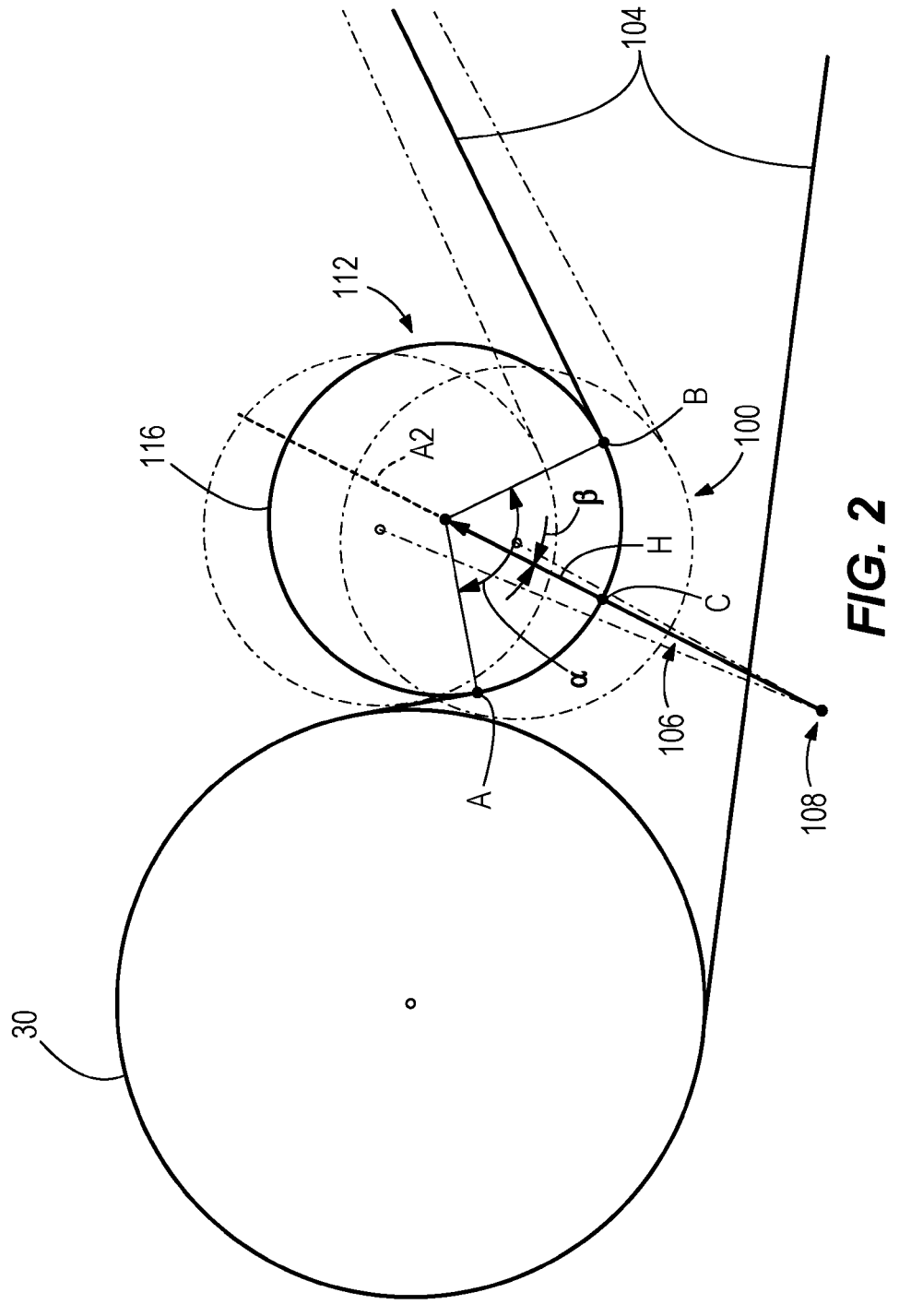
FIG. 2 illustrates a schematic view of a tensioning apparatus for a belt according to the present disclosure.
Figure 3:
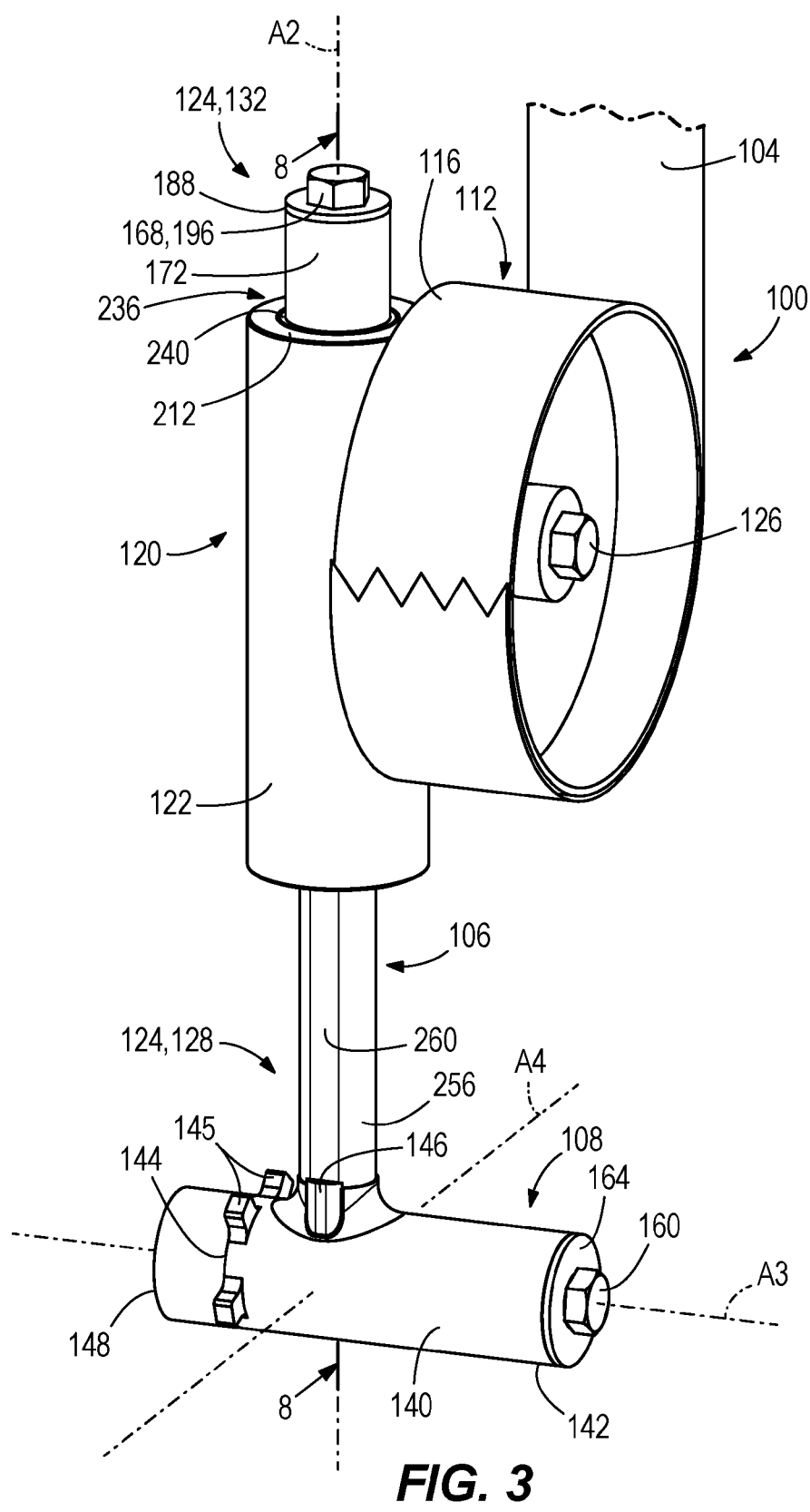
FIG. 3 illustrates a perspective view of the tensioning apparatus according to an embodiment of the present disclosure.

FIG. 2 illustrates a tensioning apparatus 100 for a belt 104 according to the present disclosure. The tensioning apparatus 100 includes an arm 106 that pivots about a pivot mount 108. The tensioning apparatus 100 includes a pulley 112 defining an outer surface 116 that is in contact with and receives the belt 104. Similar to the tensioning apparatus 10, the tensioning apparatus 100 includes the angular span a or wrap disposed between the points A and B. The belt 104 induces the hub load H on the pulley 112 at the point C, midway between the points A and B. The hub load H is aligned with an adjustment axis A2 defined by the arm 106 (FIG. 3). Thus, the differential angle β is zero as shown in FIG. 2—i.e., there is no differential angle and no moment working on the arm 106. In contrast to the traditional tensioning apparatus 10, the tensioning apparatus 100 does not require a spring transverse to the arm 106 because there is not a moment working against the arm 106. When the direction of the hub load H changes (e.g., during installation or from belt elongation over time), the arm 106 freely pivots about the pivot mount 108 to maintain the differential angle β of zero.

Figure 4:
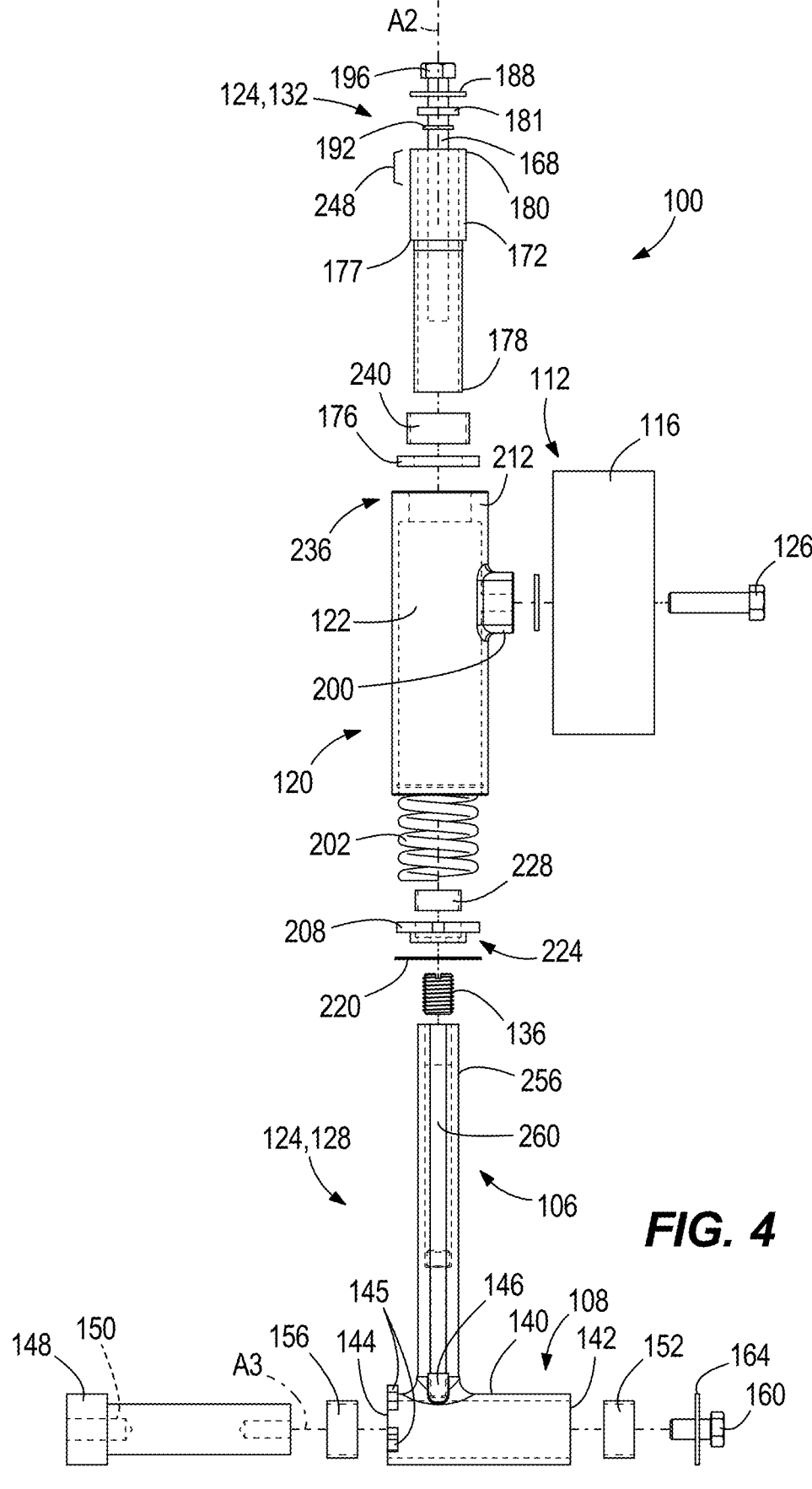
FIG. 4 illustrates an exploded view of the tensioning apparatus of FIG. 3.

FIGS. 3 and 4 illustrates the tensioning apparatus 100 including two primary assemblies, a trolley 120 and an adjustable length arm assembly 124. The trolley 120 is received on the adjustable length arm assembly 124 such that the trolley 120 may axially slide along the adjustment axis A2. The trolley 120 includes a main body 122 that is generally hollow (e.g., tubular). In the illustrated construction, the main body 122 is a cast part. The trolley 120 supports the pulley 112 for rotation via a fastener 126. The adjustable length arm assembly 124 is comprised of a fixed-length portion 128 and an adjuster portion 132. The adjuster portion 132 is configured for axial adjustment along the adjustment axis A2 relative to the fixed-length portion 128 to change the overall length of the adjustable length arm assembly 124. The adjuster portion 132 is coaxial with the main body 122.

Figures 5A, 5B:
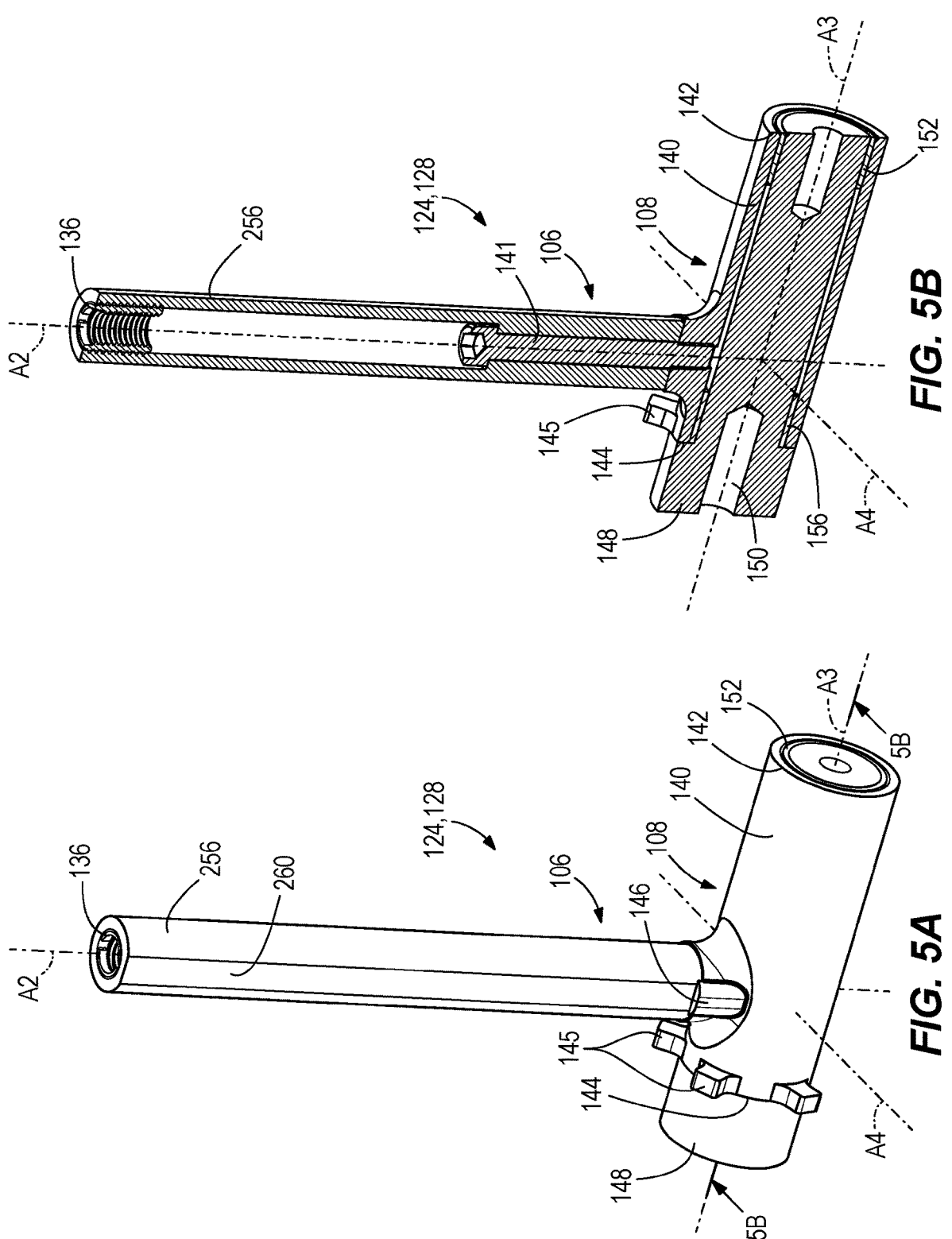
FIG. 5A illustrates a perspective view of a fixed-length portion of the tensioning apparatus of FIG. 3.
FIG. 5B illustrates a longitudinal cross-section of the fixed-length portion taken along line 5B-5B of FIG. 5A.

FIGS. 5A and 5B illustrate the fixed-length portion 128 including the arm 106 and the pivot mount 108 that defines a pivot axis A3. The pivot axis A3 intersects the adjustment axis A2 at an intersection point 134 and is perpendicular to the adjustment axis A2. In the illustrated construction, the arm 106 is a drawn tube. The arm 106 is configured to receive an insert 136, which threadably receives the adjuster portion 132. In some constructions, the arm 106 is hollow and the insert 136 is press-fit and/or bonded to the arm 106. In some constructions, the arm 106 is configured to directly threadably receive the adjuster portion 132 without a separate insert. The pivot mount 108 includes a pivot body 140 coupled to the arm 106 to form an "L" shape. In the illustrated construction, the arm 106 and the pivot body 140 are coupled together via a fastener 141. In the illustrated construction, the pivot body 140 is a cast part. The pivot body 140 includes a first end 142 and a second end 144 proximal to the arm 106. The pivot body 140 includes a plurality of flanges 145. Each of the plurality of flanges 145 extend radially outward from an outer surface of the pivot body 140 relative to the pivot axis A3. The plurality of flanges 145 are configured to engage a protrusion (e.g., a cap screw) extending from a machine having the belt drive system (not shown) such that rotation of the pivot mount 108 is limited about the pivot axis A3. In the illustrated construction, the plurality of flanges 145 includes 3 flanges. In other constructions, the plurality of flanges 145 includes less than 3 flanges or greater than 3 flanges. The pivot body 140 includes a key 146 extending from the outer surface of the arm in a direction parallel to the adjustment axis A2. The pivot body 140 receives a pin 148 supported by a first bushing 152 located proximal to the first end 142 and a second bushing 156 located proximal to the second end 144. The pivot body 140 and the pin 148 are coupled for rotation about the pivot axis A3 via the bushings 152, 156. The pin 148 receives a fastener 160 and a washer 164 to couple the pivot body 140 to the pin 148. The pin 148 includes an aperture 150 a fastener (not shown) that couples the fixed-length portion 128 to a machine having the belt drive system (not shown) for rotation of the tensioning apparatus 100, including the trolley 120 and the adjustable length arm assembly 124, about the pivot axis A3.

Figures 6A, 6B:
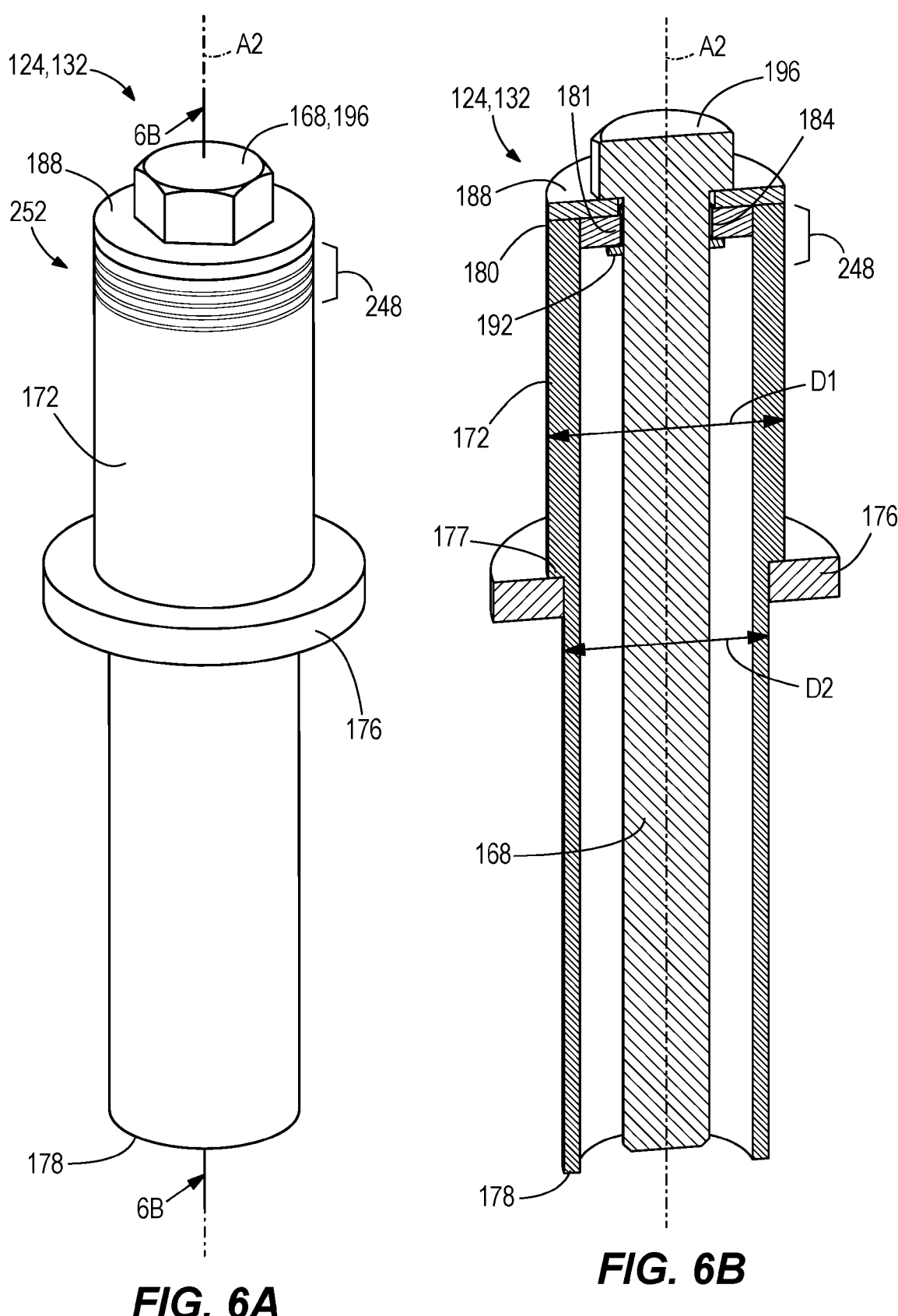
FIG. 6A illustrates a perspective view of an adjuster portion of the tensioning apparatus of FIG. 3.
FIG. 6B illustrates a longitudinal cross-section of the adjuster portion taken along line 6B-6B of FIG. 6A.

FIGS. 6A and 6B illustrate the adjuster portion 132 including a fastener 168 configured to be coupled (e.g., threaded) to the insert 136 of the fixed-length portion 128. In the illustrated construction, the fastener 168 is coaxial with the fastener 141. In the illustrated construction, the fastener 168 has a threaded portion received by threads of the insert 136 such that the fastener 168 may be axially adjusted along the adjustment axis A2. The adjuster portion 132 includes a sleeve 172 and an engagement member 176. In the illustrated construction, the sleeve 172 is machined from tubing and the engagement member 176 is a machined part. The sleeve 172 includes a portion with a first outer diameter D1 and a portion with a second outer diameter D2 smaller than the first outer diameter D1. The engagement member 176 is in the shape of a washer (e.g., a hollow ring or disk) and is received on the second outer diameter D2 and contacts a ledge 177 formed between the portions of the first outer diameter D1 and the second outer diameter D2. The sleeve 172 includes a first end 178 and a second end 180 having a cap 181. The first end 178 is open such that the first end 178 is received by the arm 106. The cap 181 includes an aperture 184 to receive the fastener 168 and is coupled to the second end 180. The cap 181 is flanked on each axial side by an exterior washer 188 and an interior washer 192 (e.g., a push-on fastener) such that the sleeve 172 is axially fixed relative to the fastener 168. The exterior washer 188 is disposed between a head 196 of the fastener 168 and the second end 180. As described in further detail below, the adjuster portion 132 provides a plunger assembly that acts on one end of a biasing member 202 of the tensioning apparatus 100.

Figures 7A, 7B:
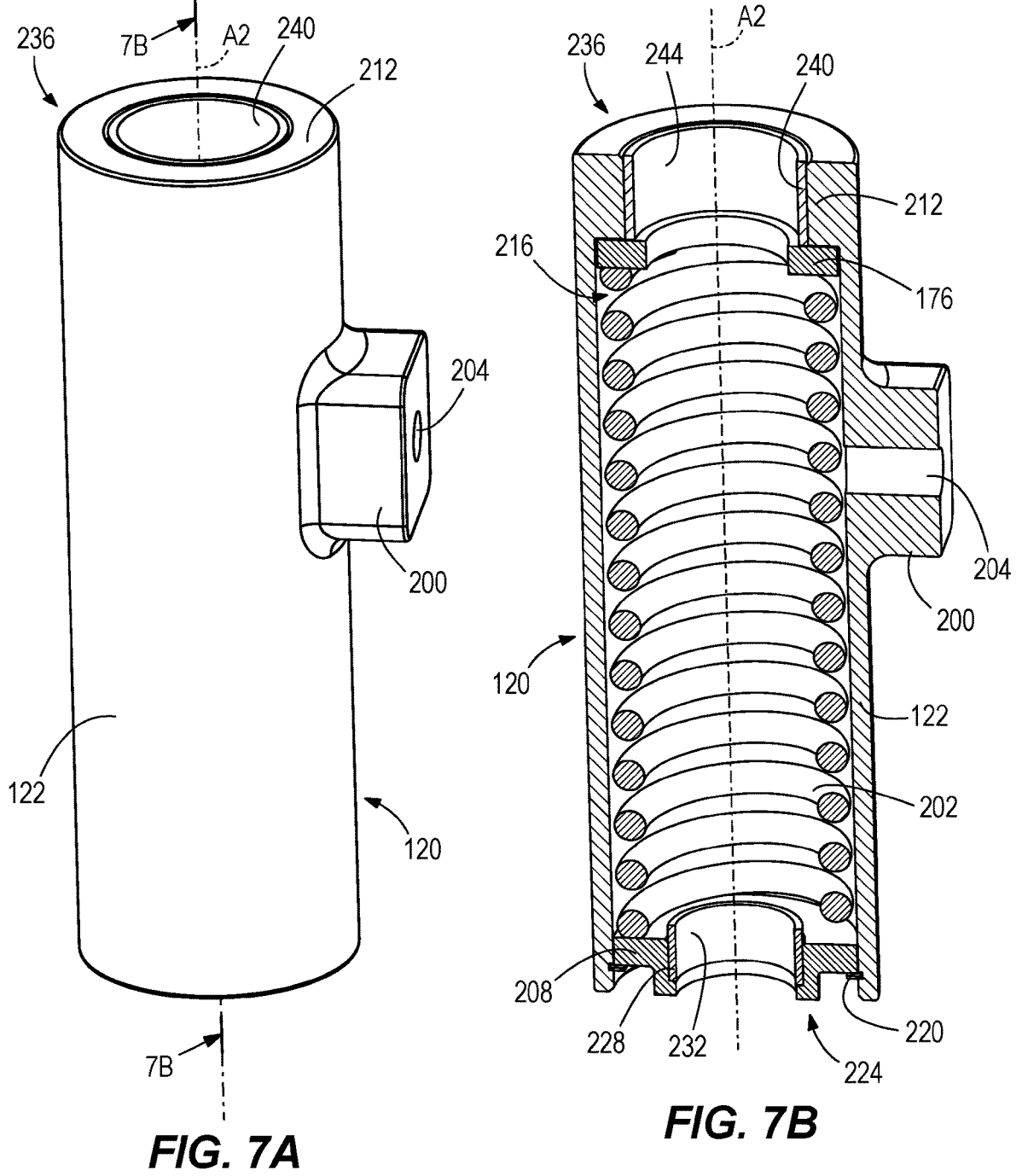
FIG. 7A illustrates a perspective view of a trolley of the tensioning apparatus of FIG. 3.
FIG. 7B illustrates a longitudinal cross-section of the trolley taken along line 7B-7B of FIG. 7A.

FIGS. 7A and 7B illustrate the trolley 120 including a mount 200 configured to receive the fastener 126 via an aperture 204 such that the pulley 112 is supported for rotation about the fastener 126. The trolley 120 includes a first end cap 208 and a second end cap 212 proximal to the mount 200. The end caps 208, 212 partially close ends of the main body 122 and retain the biasing member 202. In the illustrated construction, the first end cap 208 is a separately formed part that is coupled to the main body 122. In other constructions, the first end cap 208 is integrally formed with the main body 122 (e.g., the first end cap 208 and the main body 122 are formed as a single piece). In the illustrated construction, the second end cap 212 is integrally formed with the main body 122 (e.g., the second end cap 212 and the main body 122 are formed as a single piece). In other constructions, the second end cap 212 is a separately formed part that is coupled to the main body 122. An interior cavity 216 is defined within the trolley 120 between the first and second end caps 208, 212. The biasing member 202 (e.g., a spring) is disposed within the interior cavity 216. The trolley 120 includes a retaining ring 220 that abuts the first end cap 208 and is received in a groove of the main body 122. The first end cap 208 is retained within the main body 122 by the biasing member 202 and the retaining ring 220. Specifically, the first end cap 208 is sandwiched between the biasing member 202 and the retaining ring 220. As further described below, the adjustable length arm assembly 124, particularly the adjuster portion 132 thereof, is operable to move the trolley 120 indirectly through the biasing member 202 either toward or away from the belt 104. The biasing member 202 is engaged by the engagement member 176, and in turn, the biasing member 202 engages the first end cap 208 of the trolley 120 such that the trolley 120 is biased by stored energy in the biasing member 202 along the adjustment axis A2 toward the pivot axis A3 (FIG. 8).

As illustrated, the biasing member 202 is disposed radially about the adjustment axis A2 between an interior wall of the trolley 120 and an exterior wall of the adjustable length arm assembly 124. The exterior wall of the adjustable length arm assembly 124 is jointly formed by the fixed-length portion 128 and the adjuster portion 132 (FIG. 8). The trolley 120 includes a first bushing 224 received by the first end cap 208. In the illustrated construction, the first bushing 224 includes a body 228 having an interior surface 232 configured to slide along the arm 106. The body 228 is pressed into the first end cap 208 and is a dry bearing. Specifically, the body 228 is a metal-polymer composite bearing. The body 228 is sized to accommodate the arm 106. The trolley 120 includes a second bushing 236 received by the second end cap 212. The second bushing 236 includes a body 240 having an interior surface 244 configured to slide along an outer surface of the sleeve 172 of the adjuster portion 132. The body 240 is pressed into the second end cap 212 and is a dry bearing. Specifically, the body 240 is a metal-polymer composite bearing. The body 240 is sized to accommodate the sleeve 172. The first and second bushings 224, 236 form sliding interfaces for the adjustable length arm assembly 124 as described in further detail below.

Figure 8:
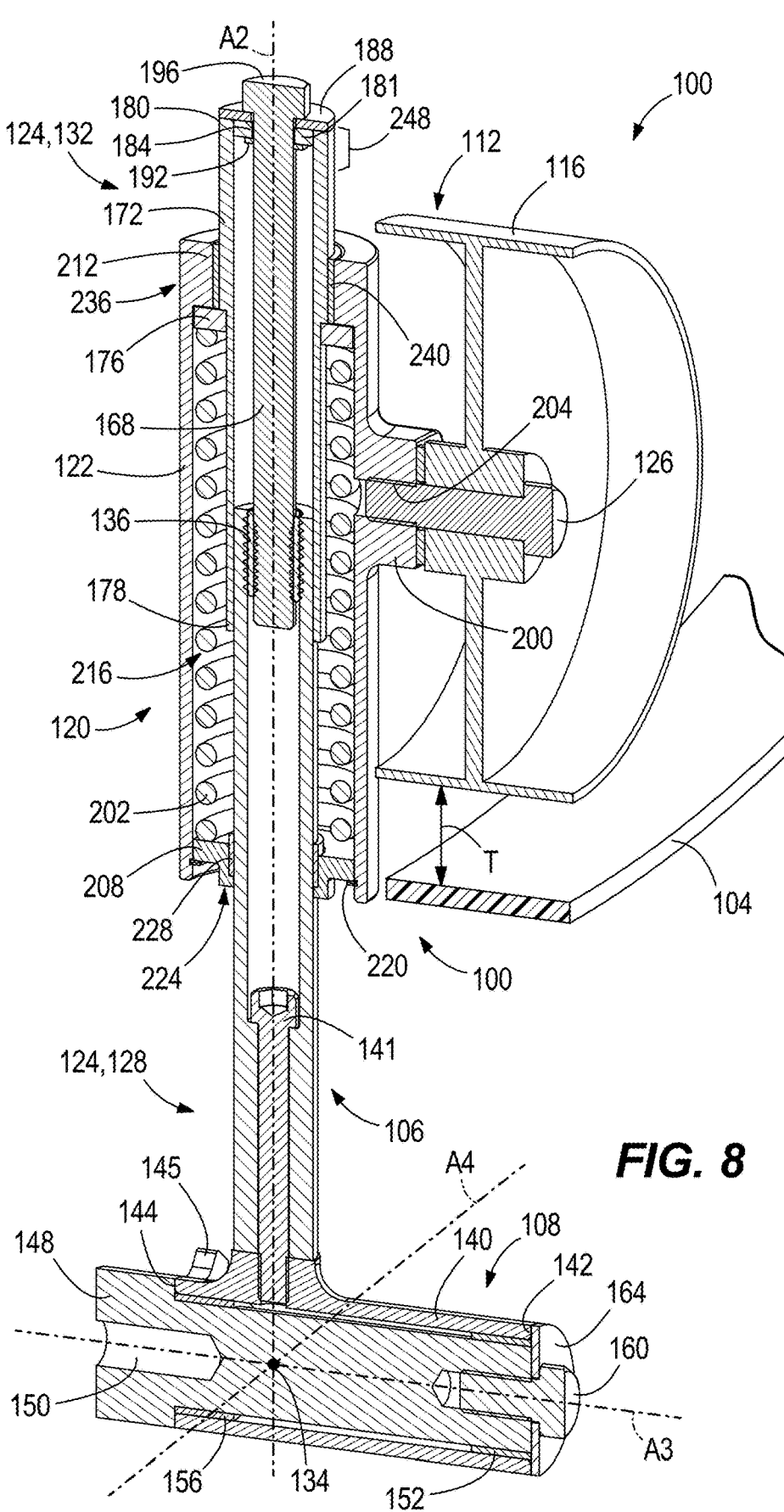
FIG. 8 illustrates a longitudinal cross-section of the tensioning apparatus taken along line 8-8 of FIG. 3, the tensioning apparatus in an installation position.

FIG. 8 illustrates the cross-section of the tensioning apparatus 100 in an assembled state. In the assembled state, the fixed-length portion 128 is coupled to a threaded aperture in the machine (not shown) via the fastener 160 extending through the pivot mount 108 for rotation about the axis A3. The trolley 120 is received on the adjustable length arm assembly 124 to axially side along the adjustment axis A2. Specifically, the first bushing 224 slides along an outer surface of the arm 106. The second bushing 236 axially slides along the adjustment axis A2 on an outer surface of the sleeve 172 of the adjuster portion 132. The sleeve 172 is coupled to the fastener 168 at the second end 180, and the fastener 168 is coupled to the insert 136 of the fixed-length portion 128. The fastener 168 is configured for axial adjustment along the adjustment axis A2 in response to adjustment (e.g., rotation). The first end 178 of the sleeve 172 receives a distal portion of the arm 106. The engagement member 176 is received on the sleeve 172 and within the interior cavity 216 of the trolley 120 such that the engagement member 176 is disposed between the second end cap 212 and an end of the biasing member 202. The biasing member 202 is disposed in the interior cavity 216 of the trolley 120 and an exterior of the adjustable length arm assembly 124. The engagement member 176 engages and deforms the biasing member 202 in response to adjustment of the fastener 168. The biasing member 202 is disposed between the engagement member 176 and the first end cap 208 to supply a biasing force to the first end cap 208 so as to bias the trolley 120 toward the axis A3. The pulley 112 is coupled to the trolley 120 via the fastener 126 received by the aperture 204 of the mount 200, and as such the pulley 112 is also biased toward the axis A3.

Additionally, it is noted that FIG. 8 illustrates the tensioning apparatus 100 in an extended position. In the extended position, the belt 104 is not in contact with the outer surface 116 of the pulley 112. A gap T is disposed between the belt 104 and the outer surface 116 of the pulley 112. The extended position of the tensioning apparatus 100 is used to adjust the belt 104 or replace the belt 104. Since the belt 104 is not exerting a force on the pulley 112, the trolley 120 experiences a force induced by the biasing member 202 acting on the first end cap 208 of the trolley 120 and an equal and opposite reaction force from the engagement member 176 to the second end cap 212 of the trolley 120. Although the biasing member 202 engages the engagement member 176, the engagement member 176 does not move because it is coupled to the fastener 168, which in turn, is coupled to the fixed-length portion 128. Since the engagement member 176 is coupled to the fastener 168, the engagement member 176 moves axially in unison with the fastener 168 when the fastener 168 is adjusted along the adjustment axis A2. The trolley 120 moves axially in unison with the engagement member 176 when the belt 104 does not exert a force on the pulley 112 due to the force relationship described above. Specifically, the biasing force induced by the biasing member 202 on the first end cap 208 is balanced by the reaction force from the engagement member 176 to the second end cap 212 such that the trolley 120 moves in unison with the engagement member 176. The capability of the trolley 120 to move axially in unison with the adjuster portion 132 is illustrated by the different positions of the fastener 168 and the trolley 120 between the extended position and the belt contact position (FIGS. 8 and 9).

Figure 9:
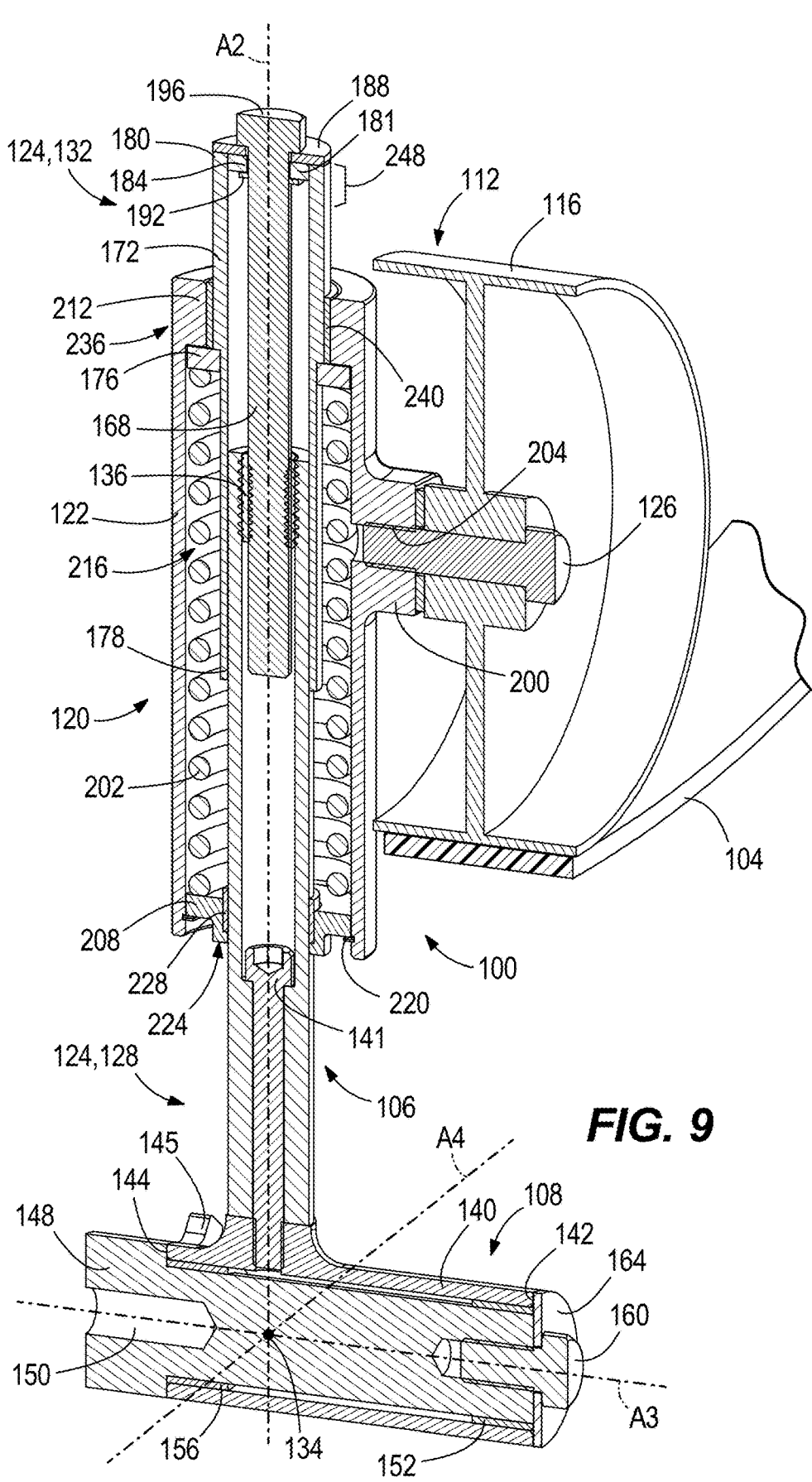
FIG. 9 illustrates a longitudinal cross-section of the tensioning apparatus similar to FIG. 8, but showing the tensioning apparatus in a belt contact position.

FIG. 9 illustrates the tensioning apparatus 100 in a belt contact position. To reach the belt contact position of FIG. 9 during installation, the tensioning apparatus 100 is axially adjusted from the extended position of FIG. 8 to the belt contact position such that the outer surface 116 of the pulley 112 establishes contact with the belt 104. However, in the belt contact position, neither the belt 104 nor the pulley 112 exert a force on one another. The adjuster portion 132 is axially adjusted along the adjustment axis A2 by operation of the fastener 168 relative to the insert 136 to move from the extended position to the belt contact position. Since the belt 104 and the pulley 112 do not exchange forces, the trolley 120 and the adjuster portion 132 move in unison with the fastener 168, and the biasing member 202 remains static. The first bushing 224 and the first end 178 of the sleeve 172 establish a sliding interface along an outer surface of the arm 106 when moving between the extended position and the belt contact position.

Figure 10:
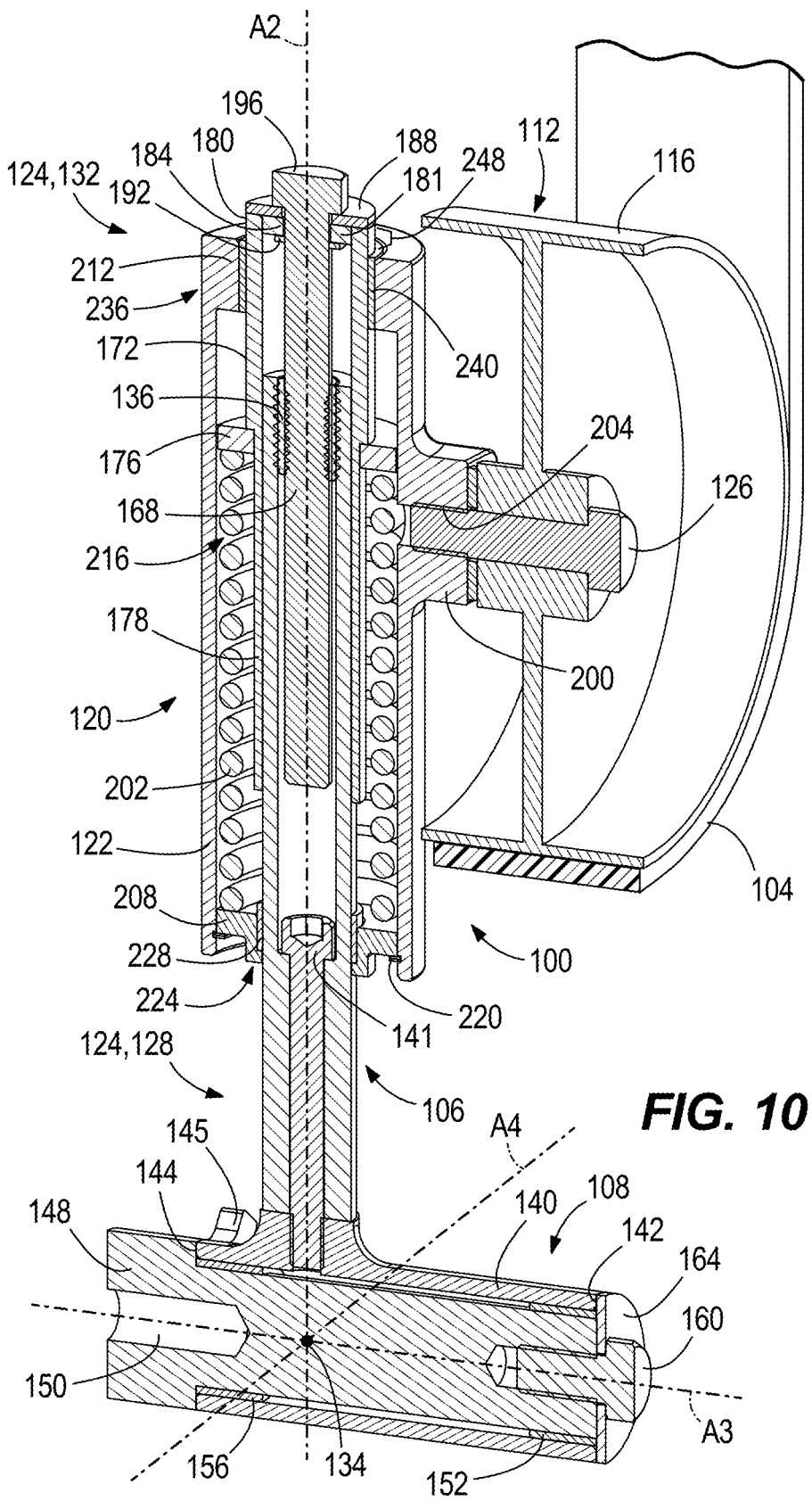
FIG. 10 illustrates a longitudinal cross-section of the tensioning apparatus similar to FIG. 8, but showing the tensioning apparatus in a belt tension position.

FIG. 10 illustrates the tensioning apparatus 100 in a tensioned position. In the tensioned position, the biasing member 202 is increasingly deformed (e.g., compressed) with respect to the belt contact position of FIG. 9 and the outer surface 116 of the pulley 112 is contact with the belt 104 to provide a tensioning force. The fastener 168 is adjusted such that biasing member 202 is compressed between the engagement member 176 and the first end cap 208. In some applications, the biasing member 202 may be fully compressed. The second end cap 212 of trolley 120 is no longer in contact with the engagement member 176 because the belt 104 provides an equal and opposite reaction force against the force induced by the biasing member 202 on the first end cap 208 of the trolley 120. Previously, the equal and opposite reaction force to the biasing member 202 was provided by the second end cap 212 of the trolley 120 being supported by the engagement member 176. As a result of the belt 104 replacing the reaction force provided by the engagement member 176 for the second end cap 212, the trolley 120 no longer moves in unison with the axial adjustment of the adjuster portion 132. Rather, the axial displacement of the trolley 120 is based on the position of the belt 104 (FIG. 11).

Figure 11:
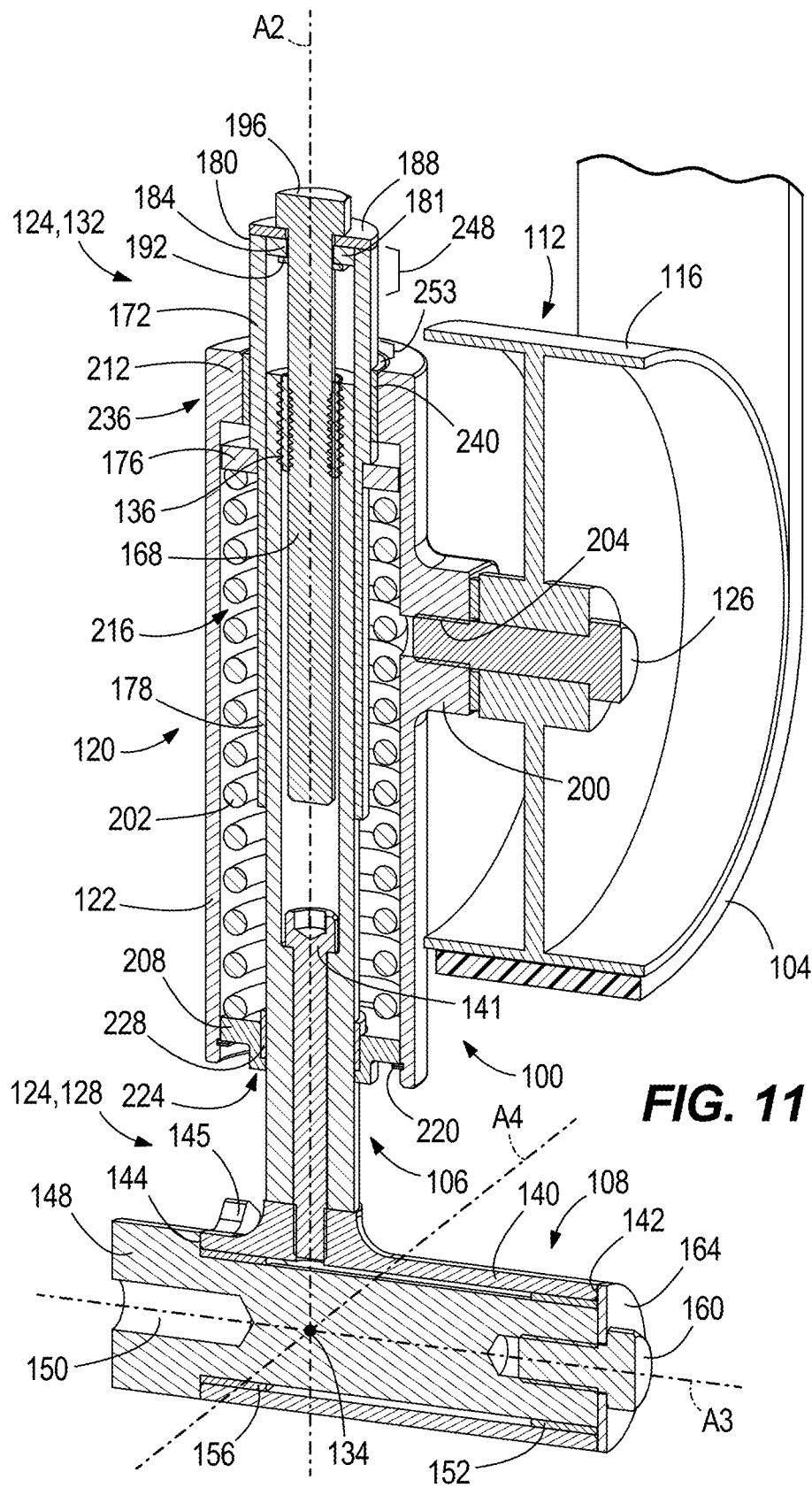
FIG. 11 illustrates a longitudinal cross-section of the tensioning apparatus similar to FIG. 8, but showing the tensioning apparatus in a belt elongated position.

FIG. 11 illustrates the tensioning apparatus 100 in an elongated position. Belts elongate due to stretching and wearing, thereby increasing the length of a belt with use over time. The tensioning apparatus 100 provides the biasing force such the belt 104 remains tensioned, despite the lengthening of the belt. FIG. 11 illustrates the change in the tensioning apparatus 100 upon being set to the tensioned position of FIG. 10 and then having the belt 104 increase in length. The biasing member 202 restores (e.g., expands) from the compressed state to accommodate for the increased length of the belt 104. In the elongated state, the belt 104 provides the reaction force to counter the biasing force induced by the biasing member 202. As such, the trolley 120 moves on the adjustable length arm assembly 124 axially along the adjustment axis A2 in response to the biasing member 202 expanding to counter the increased length of the belt 104.

The contact between the second end cap 212 of the trolley 120 and the engagement member 176 is an indication of whether the belt 104 is being actively tensioned by the tensioning apparatus 100. In some constructions, an exterior of a portion 248 of the sleeve 172 that extends from the second bushing 236 is provided with indicia 252 that reflect the status of the tension of the belt (i.e., the availability of the biasing member 202). In some constructions, the indicia 252 may be in the form of one or more measurement lines about the sleeve 172, as illustrated in FIG. 6A. The lines may be imprinted (e.g., marked on or etched into) the sleeve 172. In other constructions, the portion 248 is marked as a form of indicia (even if there are no lines, per se) so that an operator knows that the tensioning apparatus 100 is in a tensioned position. For instance, the portion 248 may be marked with ink to form the indicia. In some constructions, the portion 248 is marked as a form of indicia to notify a user when to stop tightening the fastener 168 when setting the tension because the biasing member 202 is compressed sufficiently by the engagement member 176 to provide adequate tensioning to the belt 104. For instance, the difference in the span of the indicia 252 between FIGS. 9 and 10 indicate that a portion of the indicia 252 is hidden due to partial overlap of the second bushing 236. In other words, a portion of the indicia 252 is hidden in the tensioned position (FIG. 10). In some constructions, a portion 253 of the sleeve 172 may be marked to reflect the biasing member 202 being spent, or otherwise unable to provide a tensioning force for the tensioning apparatus 100 (FIG. 11). In other words, the mark in the portion 253 reflects the engagement member 176 engaging the second end cap 212. In a construction with the portions 248, 253 marked, a user identifies when to stop tightening the fastener 168 via visual observation of the mark in the portion 248 and identifies when to tighten the fastener 168 via the mark in the portion 253. In some constructions, the portion 248 is marked in a gradient color scheme (e.g., green to red) to reflect the diminishing availability of the biasing member 202 to bias the belt 104 via the trolley 120.

Figures 12A, 12B:
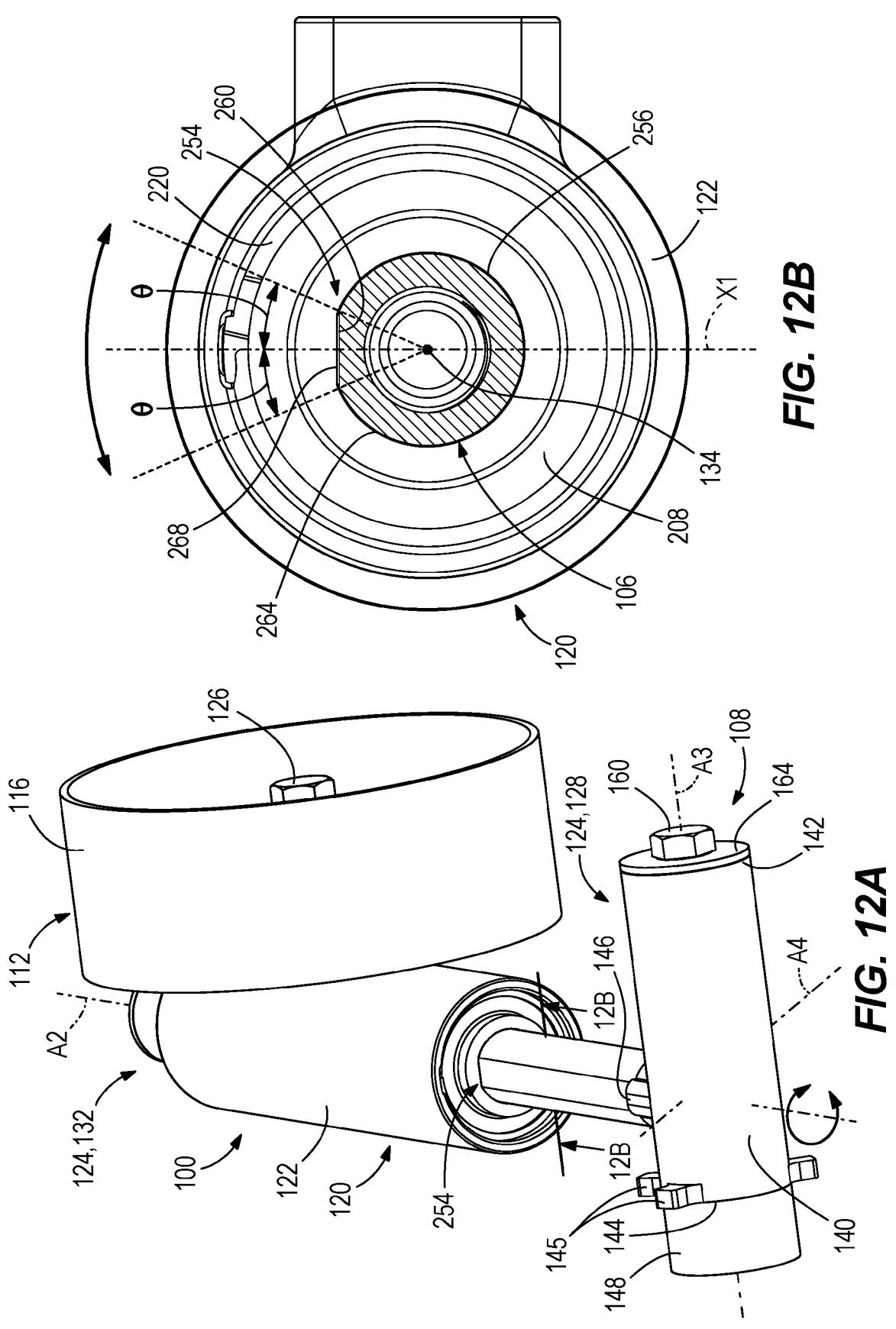
FIG. 12A illustrates a bottom perspective view of the tensioning apparatus of FIG. 3.
FIG. 12B illustrates a longitudinal cross-section of the tensioning apparatus taken along line 12B-12B of FIG. 12A, the cross-section defining an interface.

FIGS. 12A and 12B illustrate a first interface 254 defined between the trolley 120 and the adjustable length arm assembly 124 at a location of axial overlap along the adjustment axis A2 of the trolley 120 and the adjustable length arm assembly 124. The arm 106 of the fixed-length portion 128 includes an arcuate portion 256 and a flat portion 260 that each support the first end cap 208. The flat portion 260 is configured to face the key 146 when the arm 106 and the pivot body 140 are coupled together via the fastener 141. The key 146 ensures that the flat portion 260, and therefore the arm 106, is orientated to face the key 146 during assembly. The first end cap 208 includes an interior with a complementary shape to the arm 106 (e.g., the arcuate portion 256 and the flat portion 260). In the illustrated construction, the interior of the first end cap 208 includes an arcuate portion 264 and a flat portion 268. The bushing 224 includes an interior diameter that matches the arcuate portion 256 of the arm 106.

An axis A4 is located at the intersection of the adjustment axis A2 and the pivot axis A3 and is perpendicular to the adjustment axis A2 and the pivot axis A3. A plane X1 contains the axis A2 and the axis A4. In the illustrated construction, the plane X1 bisects the flat portion 260 of the arm 106. Therefore, the plane X1 is used as a reference for the exaggerated rotation of the trolley 120 about the axis A2 as shown in FIG. 12B. However, in other constructions, the flat portion 260 can be located at any angular position about the axis A2 and is not constrained to the location of the illustrated plane X1.

Figure 13:
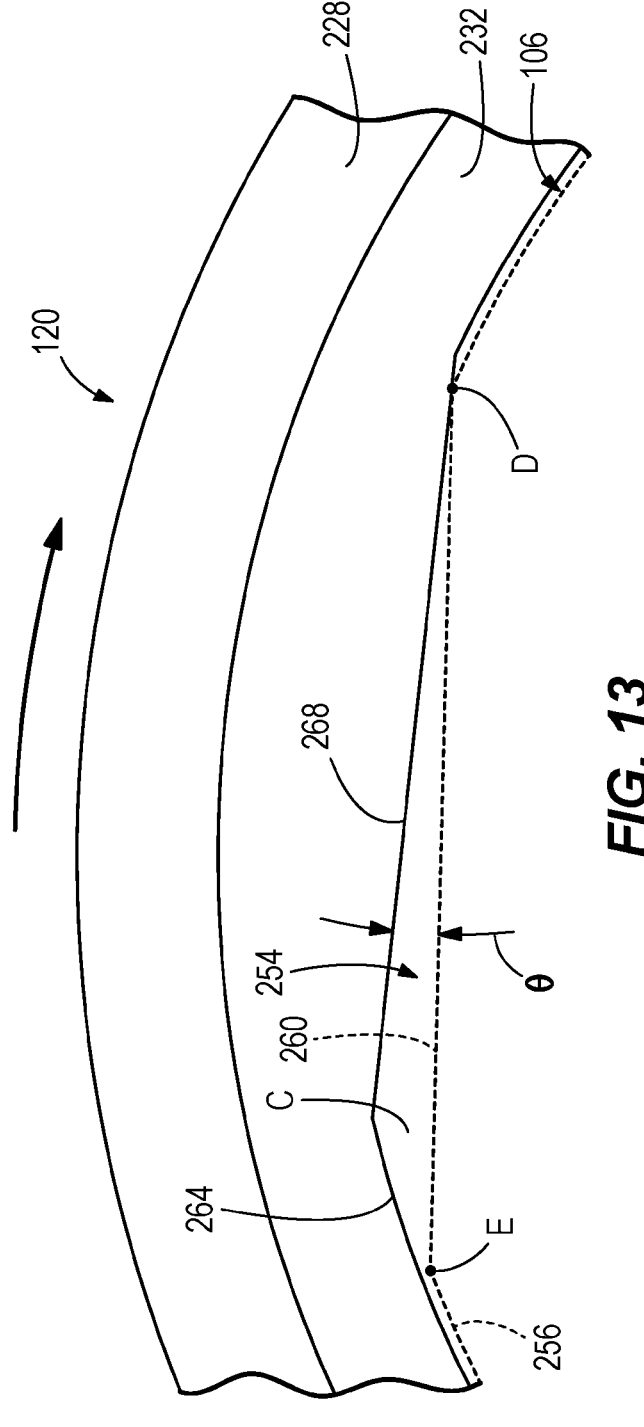
FIG. 13 illustrates a detail view of the interface of the tensioning apparatus of FIG. 3, the trolley being rotated about an adjustment axis.

As exaggerated in FIG. 12B, the trolley 120 can rotate an allowed angular offset $+/-\theta$ about the adjustment axis A2 relative to a neutral orientation (i.e., when the flat portions 260, 264 are parallel to one another). The first interface 254 includes an excess clearance C that enables predetermined rotational allowance of the trolley 120 about the adjustment axis A2 relative to the adjustable length arm assembly 124 (FIG. 13). The excess clearance C is set to achieve the predetermined rotational allowance of the trolley 120 (i.e., the allowed angular offset $+/-\theta$ about the adjustment axis A2 relative to the plane X1). In other words, the excess clearance C includes additional clearance beyond the clearance necessary for mere assembly of the trolley 120 to the adjustable length arm assembly 124 and the excess clearance C is not a random amount of clearance resulting from standard dimensional tolerance of manufacturing. In the illustrated construction, the clearance C of the first interface 254 enables the trolley 120 to rotate up to the allowed angular offset $+/-\theta$ about the adjustment axis A2 and relative to the adjustable length arm assembly 124. In some constructions, the allowed angular offset $\theta$ is equivalent to 8°. With an angle of 8°, the trolley 120 is capable of rotating between any angle from +8° to −8° about the adjustment axis A2 and relative to the flat portion 260 of the arm 106. In some constructions, the clearance C of the first interface 254 provides the allowed angular offset θ between ⅓° and 2°. In some constructions, the allowed angular offset θ is greater than 0° and up to 8°. The capability of the trolley 120 to rotate about the adjustment axis A2 mitigates misalignment of the pulley 112 on the belt 104, whose direction is typically set by working pulleys on either side of the tensioner pulley 112. For example, the surface for mounting the tensioning apparatus 100 may not inherently provide alignment between the tensioner pulley 112 and the run of the belt 104 between the working pulleys. Since the trolley 120 may rotate a predetermined amount about the adjustment axis A2, the trolley 120 may be able to self-align to follow or "track" the run of the belt 104. In some constructions, there is no allowed angular offset (i.e., θ is equivalent to 0°). In instances of insufficient clearance between the tensioner pulley 112 and nearby structure, the prevention of rotation of the tensioner pulley 112 about the adjustment axis A2 prevents contact between the tensioner pulley 112 and the nearby structure.

As illustrated in FIG. 13, the trolley 120 is rotated clockwise about the adjustment axis A2 by the allowed angular offset θ. The flat portion 268 contacts the flat portion 260 at point D and prevents further clockwise rotation about the axis A2. In the illustrated construction, the allowed angular offset θ is measured as the difference in angular position of the flat portion 268 relative to the flat portion 260. The trolley 120 is capable of rotating counterclockwise and is limited in rotation about the adjustment axis A2 by contact between the flat portion 260 and the flat portion 268 at point E. The maximum clockwise and counterclockwise rotation of the trolley 120 about the adjustment axis A2 is controlled by the interaction of the flat portions 260, 268. In an instance that the allowed angular offset θ is increased for counterclockwise or clockwise rotation of the trolley 120 about the adjustment axis A2, the contact between the flat portion 260 and the flat portion 268 occurs at a larger angle. Similarly, if the allowed angular offset θ is decreased for counterclockwise or clockwise rotation of the trolley 120 about the adjustment axis A2, the contact between the flat portion 260 and the flat portion 268 occurs at a smaller angle.

Figure 14:
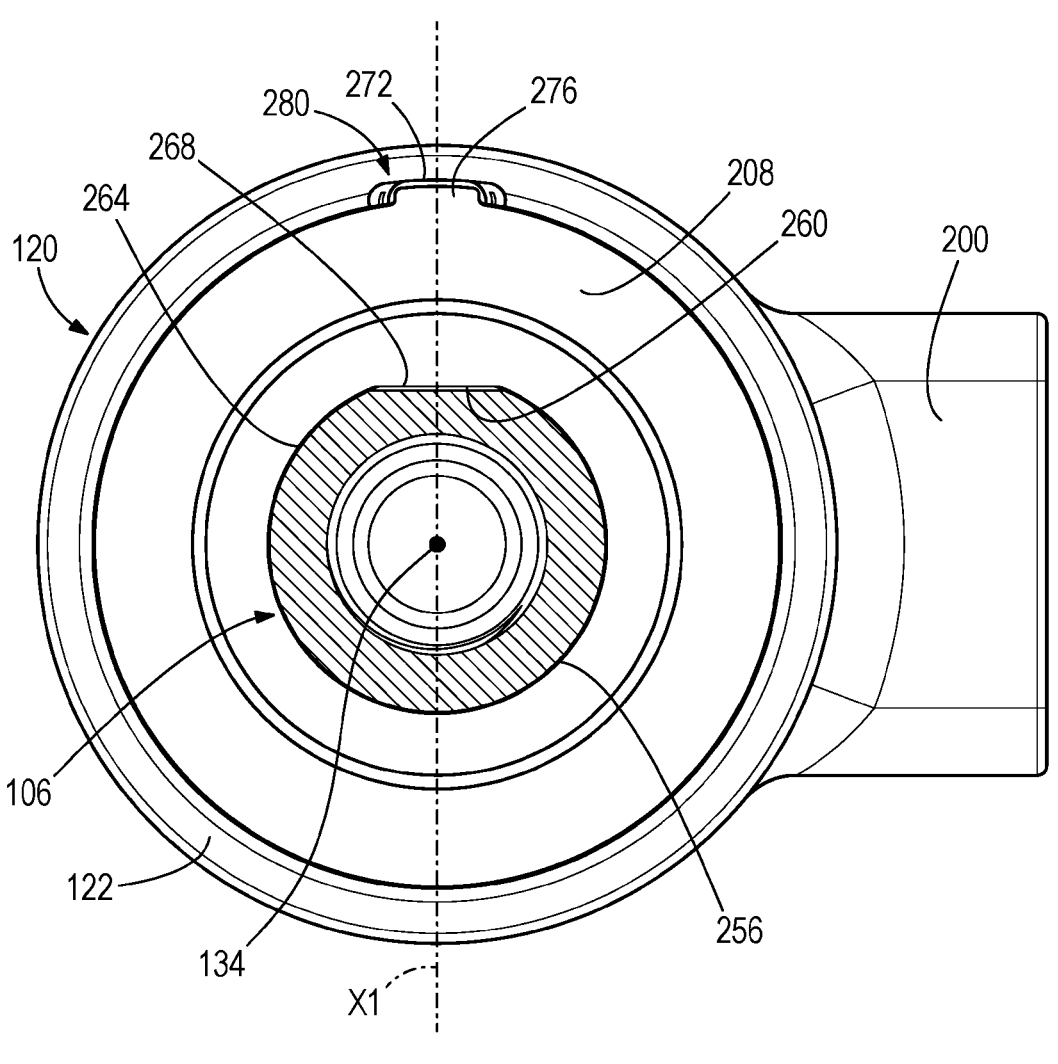
FIG. 14 illustrates a longitudinal cross-section of the tensioning apparatus taken along line 12B-12B of FIG. 12A, with a retaining ring hidden.

FIG. 14 illustrates the cross section take at 12B-12B with the retaining ring 220 removed. The trolley 120 includes a groove 272 that receives a projection 276 of the first end cap 208. The groove 272 and the projection 276 define a second interface 280 between the trolley 120 and first end cap 208. The projection 276 locates the first end cap 208 relative to the trolley 120 in an angular direction relative to the adjustment axis A2 by being received in the groove 272. In the illustrated construction, the second interface 280 does not include clearance (i.e., the second interface 280 does not contribute to the angular offset +/−θ). In some constructions, the second interface 280 includes circumferential clearance between the groove 272 and the projection 276, which is additive with the clearance C at the interface 254 to define the overall allowed angular offset +/−θ between the arm 106 and the trolley 120.

FIGS. 15A and 15B illustrates another construction of a trolley 300. The trolley 300 is interchangeable with the trolley 120. Since the trolley 120 and the trolley 300 are similar, only the differences are discussed. The trolley 300 includes a mount 304 disposed on an outer surface of the trolley 300 and proximal to the second end cap 212 or the second bushing 236 (not shown). In other constructions, the mount 304 may be located proximal to the first end cap 208. The mount 304 may be located between the first end cap 208 and the second end cap 212.

What is claimed is:

1. A tensioning apparatus for a belt, the tensioning apparatus comprising:
a pulley defining an outer surface to receive the belt;
a trolley including a mount configured to support the pulley for rotation, a first bushing, a second bushing, and an interior cavity;
a biasing member disposed within the interior cavity; and
an adjustable length arm assembly including a fixed-length portion and an adjuster portion, wherein the fixed-length portion includes a pivot mount for rotatably mounting the tensioning apparatus,
wherein the adjuster portion includes a fastener threaded to the fixed-length portion, and the adjuster portion includes an engagement member that engages and deforms the biasing member in response to adjustment of the fastener,
wherein the first bushing and the second bushing establish a sliding interface along an outer surface of the adjustable length arm assembly for movement of the trolley.

2. The tensioning apparatus of claim 1, wherein the mount is disposed on an outer surface of the trolley and is proximal to the second bushing.

3. The tensioning apparatus of claim 1, wherein the trolley includes
a main body,
a first end cap, and
a second end cap, wherein the first and second end caps partially close ends of the main body, and wherein the second end cap and the main body are constructed of a single piece.

4. The tensioning apparatus of claim 3, wherein the trolley includes a retaining ring and wherein the first end cap is received in the interior cavity between the biasing member and the retaining ring.

5. The tensioning apparatus of claim 1, wherein the adjuster portion includes a sleeve having a ledge, wherein the engagement portion contacts the ledge.

6. The tensioning apparatus of claim 5, wherein the fixed-length portion includes an arm having a flat portion fastened to the pivot mount, wherein the pivot mount includes a key, and wherein the flat portion is configured to face the key.

7. The tensioning apparatus of claim 1, wherein the pivot mount defines a pivot axis and wherein the pivot mount includes a plurality of flanges that extend radially outward relative to the pivot axis.

8. The tensioning apparatus of claim 1, wherein the adjuster portion includes a sleeve having a portion provided with indicia.

9. The tensioning apparatus of claim 8, wherein in a tensioned position, the portion with indicia and the second bushing partially overlap along an adjustment axis.

10. A tensioning apparatus for a belt, the tensioning apparatus comprising:
a pulley defining an outer surface to receive the belt;
a trolley including a mount configured to support the pulley for rotation and an interior cavity;
a biasing member disposed within the interior cavity; and
an adjustable length arm assembly including a fixed-length portion and an adjuster portion, wherein the fixed-length portion defines an adjustment axis, the fixed-length portion includes a pivot mount for rotatably mounting the tensioning apparatus, wherein the adjuster portion includes a fastener threaded to the fixed-length portion, and the adjuster portion includes an engagement member that engages and deforms the biasing member in response to adjustment of the fastener along the adjustment axis, wherein a first interface is defined between a cross section profile of the trolley and a cross section profile of the adjustable length arm assembly at a location of axial overlap along the adjustment axis of the trolley and the adjustable length arm assembly, wherein the first interface includes an excess clearance that is set to achieve a predetermined rotational allowance of the trolley about the adjustment axis relative to the adjustable length arm assembly.

11. The tensioning apparatus of claim 10, wherein the predetermined rotational allowance of the trolley about the adjustment axis relative to a neutral orientation is between −8 degrees and +8 degrees.

12. The tensioning apparatus of claim 10, wherein the trolley includes an end cap configured to retain the biasing member, the end cap having a projection, a groove configured to receive the projection, and a retaining ring and wherein the end cap is received in the groove and is disposed between the biasing member and the retaining ring such that the end cap is axially fixed along the adjustment axis.

13. The tensioning apparatus of claim 10, wherein the pivot mount define a pivot axis, wherein the pivot axis is perpendicular to the adjustment axis, and wherein the trolley and the pulley are configured to rotate about the pivot axis.

14. A tensioning apparatus for a belt, the tensioning apparatus comprising:

a pulley defining an outer surface to receive the belt;

a trolley including a mount configured to support the pulley for rotation, a first end and a second end opposite the first end, and an interior cavity;

a biasing member disposed within the interior cavity; and an adjustable length arm assembly including a fixed-length portion and an adjuster portion, wherein the fixed-length portion defines an adjustment axis, the fixed-length portion includes a pivot mount for rotatably mounting the tensioning apparatus, wherein the adjuster portion includes a first fastener threaded to the fixed-length portion, and the adjuster portion includes an engagement member that engages and deforms the biasing member in response to adjustment of the first fastener, wherein the biasing member is disposed between an interior of the trolley and an exterior of the adjustable length arm assembly, wherein the biasing member engages the engagement member and the first end of the trolley such that the trolley is moveable on the adjustable length arm assembly along the adjustment axis in response to the biasing member expanding.

15. The tensioning apparatus of claim 14, wherein the fastener of the adjuster portion is received in an interior of the fixed-length portion.

16. The tensioning apparatus of claim 14, wherein the fixed-length portion includes an arm coupled to the pivot mount via a second fastener and wherein the first fastener and the second fastener are coaxial.

17. The tensioning apparatus of claim 14, wherein the pivot mount includes a pivot body, a pin, and a third fastener, wherein the pivot body receives the pin, and wherein the third fastener couples the body to the pin.

18. The tensioning apparatus of claim 17, wherein the pivot body pivot mount defines a pivot axis and wherein the third fastener is configured to axially fix the trolley relative to the pivot axis.

19. The tensioning apparatus of claim 14, wherein the pivot mount includes a key that protrudes from the pivot mount in a direction parallel to the adjustment axis.

20. The tensioning apparatus of claim 14, wherein the trolley and the adjuster portion are coaxial.

* * * * *